United States Patent
Akanuma et al.

(10) Patent No.: US 8,255,936 B2
(45) Date of Patent: Aug. 28, 2012

(54) OBJECTIVE LENS DRIVE APPARATUS WHERE INTERACTION OF DRIVE MAGNETS AND DRIVE COILS DRIVE A HOLDING MEMBER THAT HOLDS THE OBJECTIVE LENS AND OPTICAL PICKUP AND OPTICAL DISK APPARATUS INCLUDING THE SAME

(75) Inventors: Goichi Akanuma, Kanagawa (JP); No-Cheol Park, Seoul (KR); Dong-Ju Lee, Seoul (KR); Myeong-Gyu Song, Seoul (KR); Yang-Hyun Seok, Seoul (KR)

(73) Assignee: Ricoh Company, Ltd., Tokyo (JP)

( * ) Notice: Subject to any disclaimer, the term of this patent is extended or adjusted under 35 U.S.C. 154(b) by 1301 days.

(21) Appl. No.: 11/987,773

(22) Filed: Dec. 4, 2007

(65) Prior Publication Data

US 2008/0151737 A1   Jun. 26, 2008

(30) Foreign Application Priority Data

Dec. 21, 2006   (JP) ................................. 2006-343713

(51) Int. Cl.
*G11B 7/09* (2006.01)
(52) U.S. Cl. ...................... 720/686; 369/44.15; 720/683
(58) Field of Classification Search ........... 720/681–685
See application file for complete search history.

(56) References Cited

U.S. PATENT DOCUMENTS

| | | | |
|---|---|---|---|
| 6,343,053 B1 | 1/2002 | Akanuma et al. | |
| 6,344,936 B1 * | 2/2002 | Santo et al. | 359/824 |
| 6,625,105 B2 * | 9/2003 | Suzuki et al. | 720/681 |
| 7,102,966 B2 * | 9/2006 | Tanaka | 369/44.16 |
| 7,266,055 B2 * | 9/2007 | Cho et al. | 369/44.14 |
| 7,287,264 B2 * | 10/2007 | Akanuma | 720/681 |
| 2001/0026528 A1 * | 10/2001 | Suzuki et al. | 369/244 |
| 2003/0012090 A1 * | 1/2003 | Kawano | 369/44.16 |
| 2003/0234990 A1 | 12/2003 | Akanuma | |
| 2004/0268373 A1 * | 12/2004 | Song et al. | 720/683 |
| 2005/0185530 A1 | 8/2005 | Akanuma | |

(Continued)

FOREIGN PATENT DOCUMENTS

JP   01-184637   7/1989

(Continued)

OTHER PUBLICATIONS

English Computer Translation of JP10-241174 (to Tateishi); pp. 1-11.*

*Primary Examiner* — Brian Miller
(74) *Attorney, Agent, or Firm* — Dickstein Shapiro LLP

(57) ABSTRACT

An objective lens drive apparatus configured to drive an objective lens that focuses a laser beam on an optical disk is disclosed, the apparatus including a holding member that holds the objective lens; at least one pair of drive magnets arranged to face each other at opposite sides of the holding member with respect a tangential direction that is parallel to a tangential line of the optical disk, the drive magnets having protruding end portions that protrude from each side of the holding member with respect to a tracking direction that is parallel to a radial direction of the optical disk; and plural drive coils configured to drive the holding member through interaction with the drive magnets, at least one of the drive coils being arranged on each side of the drive magnets with respect to the tangential direction.

11 Claims, 17 Drawing Sheets

U.S. PATENT DOCUMENTS

| | | |
|---|---|---|
| 2005/0185531 A1* | 8/2005 | Jang et al. .................. 369/44.22 |
| 2005/0229197 A1* | 10/2005 | Cheong et al. ................ 720/658 |
| 2007/0195658 A1 | 8/2007 | Akanuma |
| 2008/0117728 A1* | 5/2008 | Kim et al. .................. 369/44.15 |

FOREIGN PATENT DOCUMENTS

| | | |
|---|---|---|
| JP | 10-106002 | 4/1998 |
| JP | 10-106004 | 4/1998 |
| JP | 10-241174 A | 9/1998 |
| JP | 10-241175 | 9/1998 |
| JP | 10-247327 | 9/1998 |
| JP | 2000-285490 | 10/2000 |
| JP | 2001-331956 | 11/2001 |
| JP | 2004-095133 | 3/2004 |

\* cited by examiner

OBJECTIVE LENS DRIVE APPARATUS
WHERE INTERACTION OF DRIVE
MAGNETS AND DRIVE COILS DRIVE A
HOLDING MEMBER THAT HOLDS THE
OBJECTIVE LENS AND OPTICAL PICKUP
AND OPTICAL DISK APPARATUS
INCLUDING THE SAME

BACKGROUND OF THE INVENTION

1. Field of the Invention

The present invention relates to an objective lens drive apparatus configured to drive an objective lens that focuses a laser beam, an optical pickup that includes such an objective lens drive apparatus, and an information read/write apparatus that includes such an optical pickup.

2. Description of the Related Art

With the development of data digitizing techniques and data compression techniques, large-capacity optical disks such as the DVD (digital versatile disk) and BD (Blu-ray disk) are becoming widely used as recording media. Upon reading and writing information on such large capacity disks, a laser beam has to be accurately focused on tracks of the optical disk, which is rotated at a high speed. Therefore, an objective lens onto which the laser beam is focused has to be driven at a high speed in accordance with the deflection of the optical disk and/or the eccentricity of the tracks, for example.

An apparatus for driving such an objective lens is preferably arranged to have a movable part that is reduced in weight to enable the objective lens to be moved at a high speed and be capable of controlling high degree resonance of the mobile part resulting from the drive operations. In this regard, for example, Japanese Laid-Open Patent Publication No. 2001-331956 discloses a drive apparatus implementing the so-called moving magnet method to achieve advantageous characteristics with respect to high degree resonance, the apparatus also being configured to drive the objective lens at a high speed.

The drive apparatus disclosed in Japanese Laid-Open Patent Publication No. 2001-331956 implements measures for improving drive sensitivity for the objective lens by arranging drive magnets each facing one side and the other side of a coil to double the effective area of the coil on which electromagnetic forces act. However, in this drive apparatus, parts of the magnetic fields acting on the coil that are generated by the opposing magnets may cancel each other out. Also, it is noted that in this apparatus, a small magnetic piece is arranged within the drive coil, and the line of magnetic force from a drive magnetic field enters this magnetic piece of the drive coil from the N pole, exists the drive coil from a given location, and reenters the magnetic piece from the S pole. With such a configuration, although effective forces may be generated by the magnetic fields in the tangential directions of the magnets and their surrounding areas, undesired forces may be generated at other parts of the drive coil to thereby cause degradation in drive performance. Further, it is noted that since four drive magnets are arranged at two sides of a movable part in this drive apparatus, degradation of high degree resonance characteristics resulting from elastic deformation of the movable part may occur.

SUMMARY OF THE INVENTION

An aspect of the present invention is directed to providing an objective lens drive apparatus that is capable of effectively using magnetic fields generated by drive magnets to improve drive sensitivity for driving an objective lens.

Another aspect of the present invention is directed to providing an optical pickup that is capable of accurately focusing a laser beam on a track of an optical disk.

Another aspect of the present invention is directed to providing an optical disk apparatus that is capable of accurately reading or writing information on an optical disk.

According to one embodiment of the present invention, an objective lens drive apparatus is provided that is configured to drive an objective lens that focuses a laser beam on an optical disk, the apparatus including:

a holding member that holds the objective lens;

at least one pair of drive magnets arranged to face each other at opposite sides of the holding member with respect a tangential direction that is parallel to a tangential line of the optical disk, the drive magnets having protruding end portions that protrude from each side of the holding member with respect to a tracking direction that is parallel to a radial direction of the optical disk; and plural drive coils configured to drive the holding member through interaction with the drive magnets, at least one of the drive coils being arranged on each side of the drive magnets with respect to the tangential direction.

According to another embodiment of the present invention, an optical pickup is provided that irradiates a laser beam on an optical disk and receives reflected light from the optical disk, the optical pickup including a light source that irradiates the laser beam;

an objective lens drive apparatus according to an embodiment of the present invention that focuses the laser beam irradiated from the light source on a recording surface of the optical disk; and a light receiving system that receives the reflected light that is reflected by the recording surface of the optical disk.

According to another embodiment of the present invention, an optical disk apparatus is provided that is configured to read and/or write information on an optical disk, the optical disk apparatus including a rotational drive system that rotates the optical disk;

an optical pickup according to an embodiment of the present invention that irradiates a laser beam on a recording surface of the optical disk that is rotated by the rotational drive system; and a seek system that moves the optical pickup in the tracking direction of the optical disk.

DESCRIPTION OF THE PREFERRED EMBODIMENTS

In the following, preferred embodiments of the present invention are described with reference to the accompanying drawings.

First Embodiment

A first embodiment of the present invention is described below with reference to FIG. 1.

Figure 1:
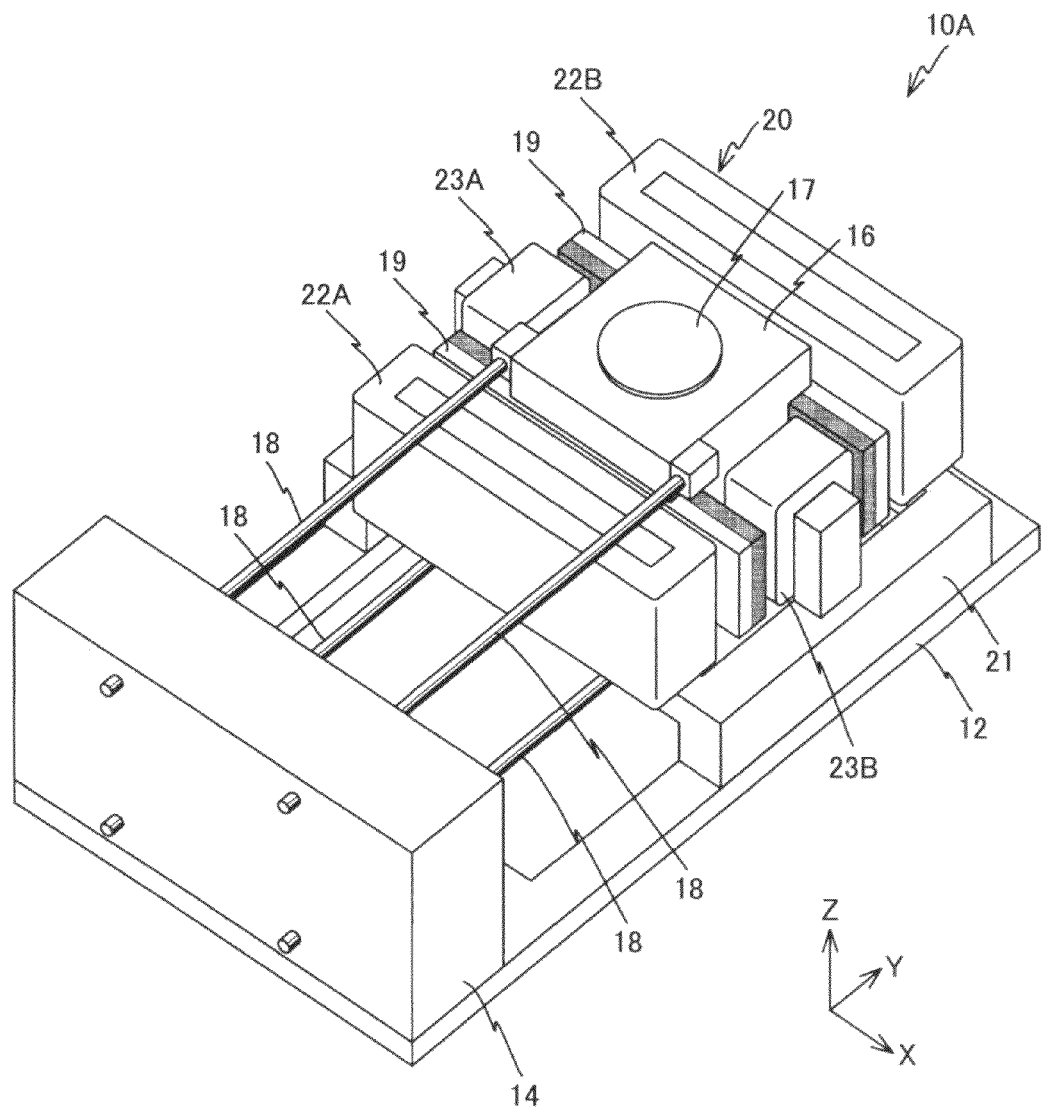
FIG. 1 is a perspective view of an objective lens drive apparatus according to a first embodiment of the present invention.

FIG. 1 is a perspective view of an objective lens drive apparatus 10A according to the first embodiment of the present invention. As is shown in FIG. 1, the optical lens drive apparatus 10A includes a base 12, a support member 14 fixed to the base 12, an objective lens holding member 16 that is supported by the support member 14 via support wires 18, a coil unit 20 arranged to surround the peripheral face of the objective lens holding member 16, and a pair of drive magnets 19 that are fixed to the objective lens holding member 16, for example.

The base 12 is made up of a frame member having a long side extending in the Y axis direction of FIG. 1 and an upper face on which the support member 14 is fixed at the −Y side end and the coil unit 20 is fixed at the +Y side end.

The support member 14 has a long side extending in the X axis direction of FIG. 1 and is fixed on the upper face of the base 12. The support member 14 is provided with some elasticity and is arranged to support the −Y side ends of four support wires 18 that extend in the Y axis direction.

Figure 2:
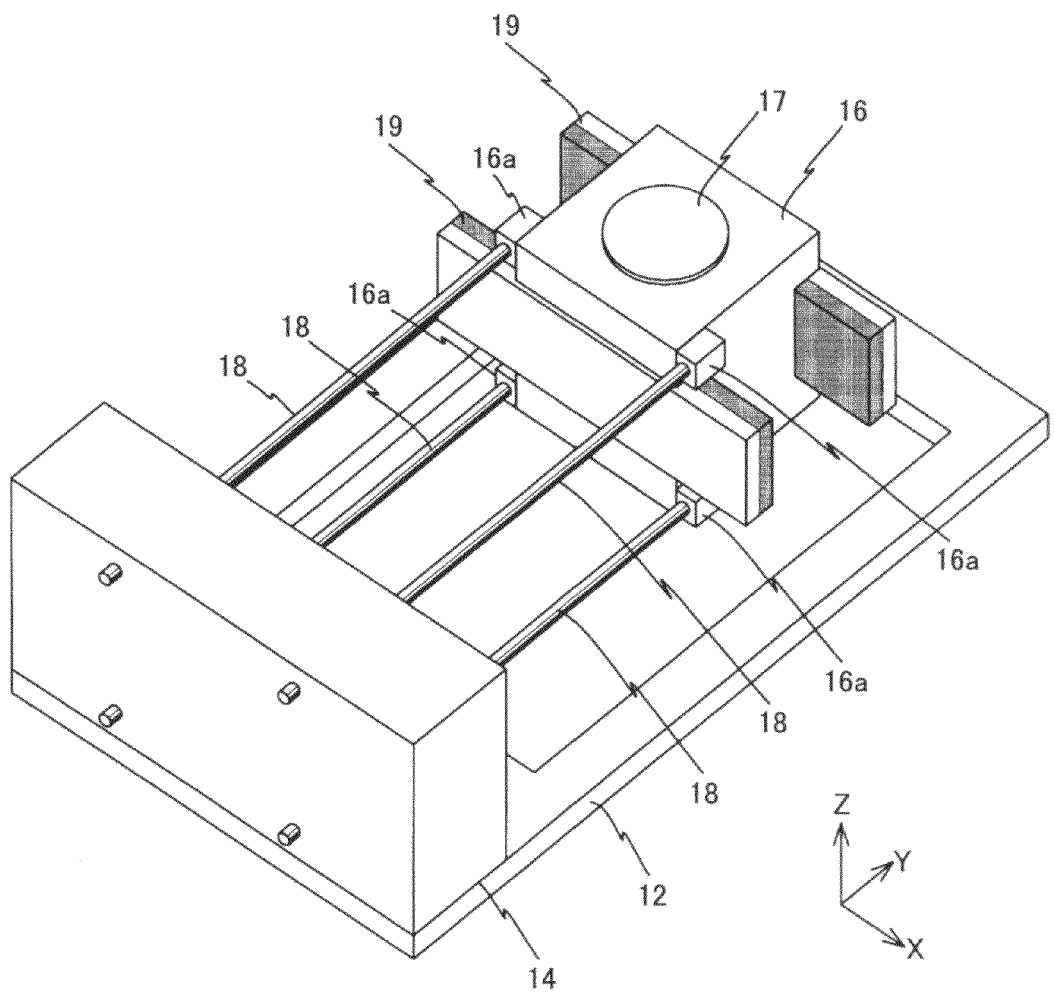
FIG. 2 is another perspective view of the objective lens drive apparatus according to the first embodiment with a coil unit being removed.

FIG. 2 is a perspective view of the objective lens drive apparatus 10A with the coil unit 20 being removed to show the objective lens holding member 16 that is supported by the support member 14 via the support wires 18. As is shown in FIG. 2, the objective lens holding member 16 is a cubic member having a through hole (not shown) extending in the Z axis direction of FIG. 2. The objective lens 17 with its optical axis extending in the Z axis direction and having substantially the same diameter as this through hole is fixed to the upper face of the objective lens holding member 16. The objective lens holding member 16 has four coupling parts 16a arranged at the −Y side corner portions of its +X side and −X side faces. The +Y side ends of the four support wires 18 are coupled to these coupling parts so that the objective lens 17 may be elastically supported by the four support wires 18 to be arranged at a substantially horizontal position.

The pair of drive magnets 19 corresponds to a pair of rectangular plate-shaped permanent magnets having long sides extending in the X axis direction. The drive magnets 19 may be fixed to the +Y side and −Y side faces of the objective lens holding member 16 with their N poles (i.e., colored portions in FIG. 2) facing each other, for example. It is noted that the length of the drive magnets 19 in the X axis direction is arranged to be substantially greater than the width of the objective lens holding member 16, and the +X side and −X side end portions of the drive magnets 19 are arranged to protrude from the +X side and −X side faces of the objective lens holding member 16. In the following descriptions, such protruding portions of the drive magnets 19 may simply be referred to as 'protruding portions'.

Figure 3:
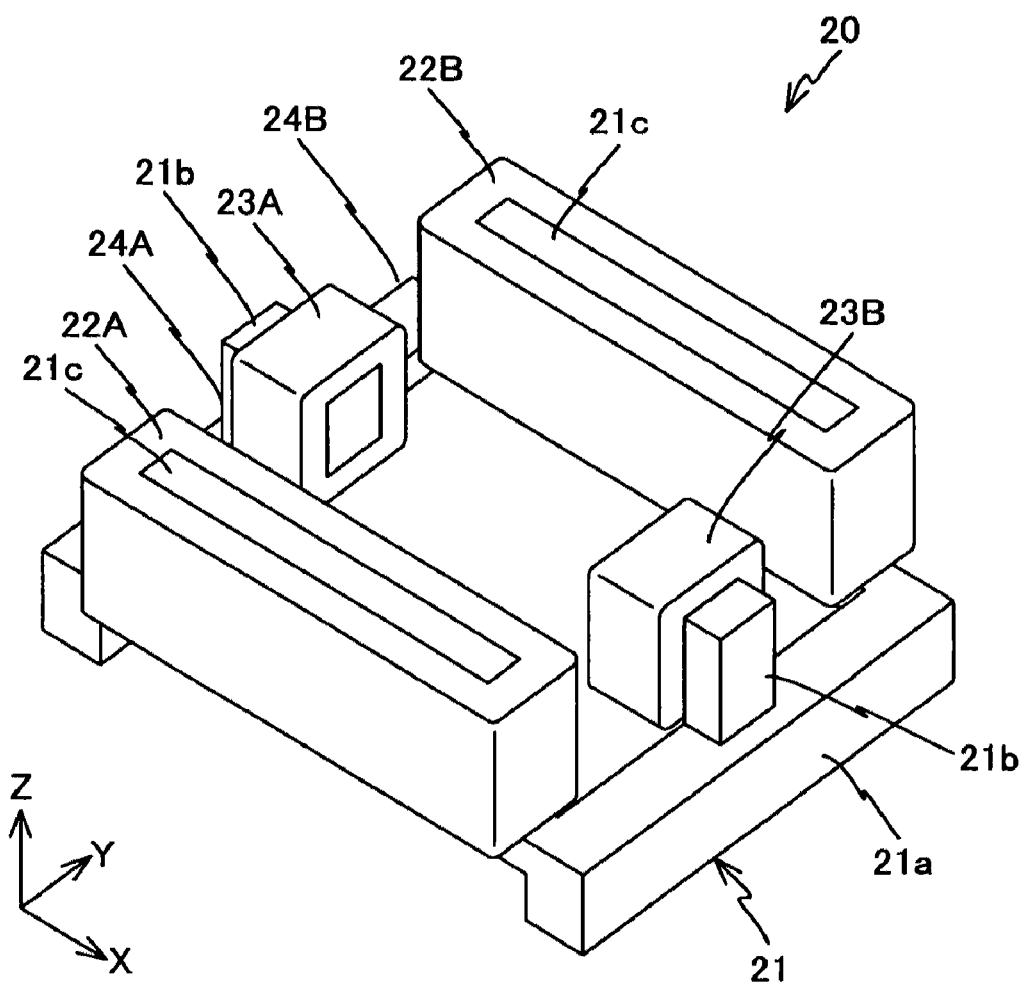
FIG. 3 is a perspective view of the coil unit of the objective lens drive apparatus according to the first embodiment.

FIG. 3 is a perspective view of the coil unit 20 of the objective lens drive apparatus 10A. As is shown in FIG. 3, the coil unit 20 includes a yoke member 21 that is fixed to the base 12, a pair of focusing drive coils 22A and 22B, and a pair of tracking drive coils 23A and 23B.

Figure 4:
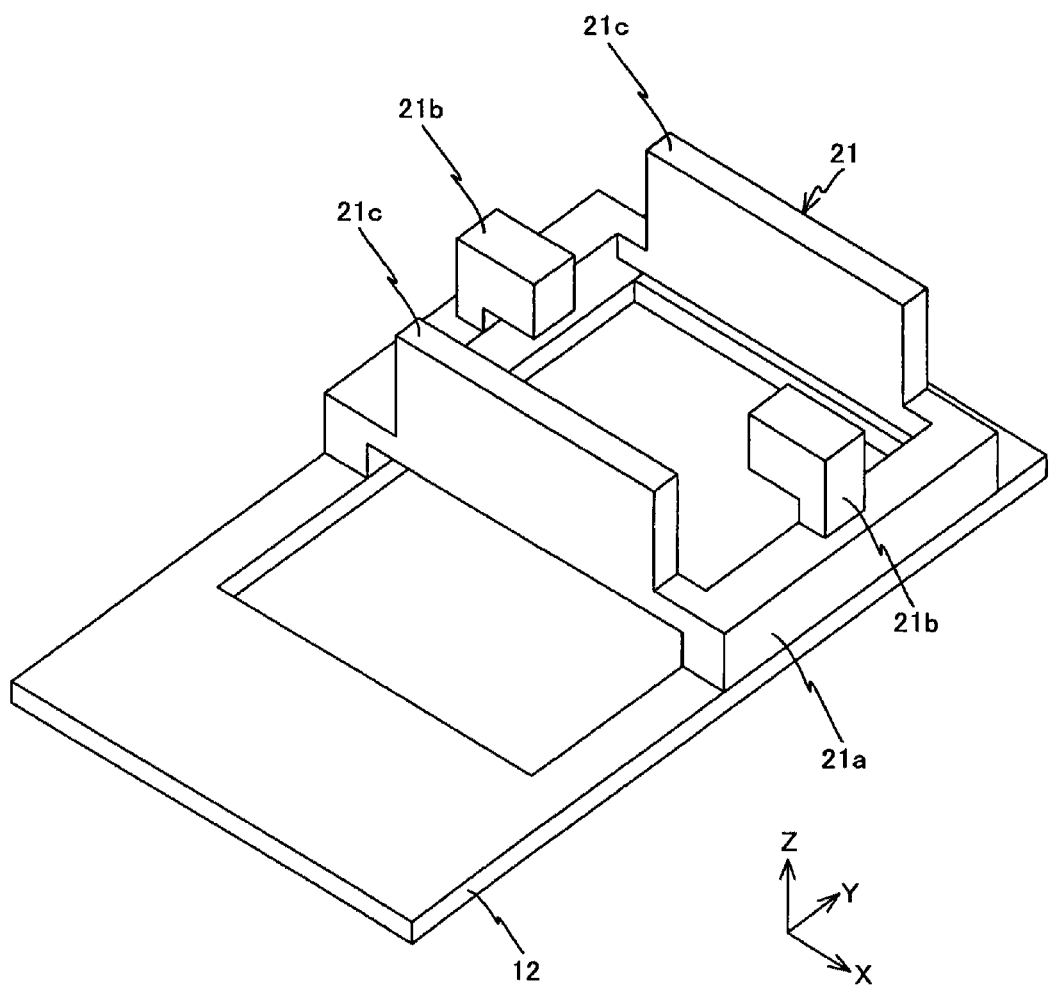
FIG. 4 is a perspective view of a yoke member and a base of the objective lens drive apparatus according to the first embodiment.

The yoke member 21 is made of a magnetic material such as iron. As is shown in FIG. 4, the yoke member 21 includes a rectangular frame portion 21a that is fixed to the upper face of the base 12, a pair of first yoke portions 21c having long sides extending in the X axis direction that are arranged at the +Y side and −Y side portions of the frame portion 21a, and a pair of L-shaped second yoke portions 21b that are arranged at +X side and −X side portions of the frame portion 21a. As is shown in FIG. 3, focusing-drive coils 22A and 22B having wires wound around shafts that are parallel to the Z axis are arranged on the first yoke portions 21c, and tracking drive coils 23A and 23B having wires wound around shafts that are parallel to the X axis are arranged on the second yoke portions 21b.

As is shown in FIG. 1, the coil unit 20 is arranged in the objective lens drive unit 10A with the focusing drive coils 22A and 22B being positioned at the −Y side and +Y side of the objective lens holding member 16 via the drive magnets 19 and the tracking drive coils 23A and 23B being positioned within the space provided between the drive magnets 19 at the −X side and +X side of the objective lens holding member 16. In this way, a magnetic circuit as is shown in FIG. 5 may be formed in the objective lens drive apparatus 10A so that the lines of magnetic force from the N poles of the drive magnets 19 may penetrate through the second yoke portion 21b, the frame portion 21a, and the first yoke portion 21c of the yoke member 21 to reenter the drive magnets 19 via their S poles as is illustrated by the arrows shown in FIG. 5.

In the above-described objective lens drive apparatus 10A according to the first embodiment of the present invention, the X axis direction is arranged to correspond to the tracking direction, the Y axis direction, to the tangential direction, and the Z axis direction, to the focusing direction with respect to the optical disk so that a laser beam emitted in the Z axis direction and incident on the objective lens 17 may be focused on the recording layer of the optical disk. By exciting the focusing drive coils 22A and 22B, the objective lens 17 may be driven in the focusing direction (Z axis direction) by the interaction of the focusing coils 22A and 22B with the drive magnets 19, and by exciting the tracking drive coils 23A and 23B, the objective lens 17 may be driven in the tracking direction (X axis direction) by the interaction of the tracking drive coils 23A and 23B with the drive magnets 19. Also, by exciting the focusing drive coils 22A and 22B in opposite directions, the objective lens 17 may be moved around a shaft that is parallel to the X axis.

As can be appreciated from the above descriptions, in the objective lens drive apparatus 10A according to the first embodiment of the present invention, the tracking direction end portions of the drive magnets 19 fixed to the objective lens holding member 16 are arranged to protrude from the −X side and +X side faces of the objective lens holding member 16, the tracking drive coils 23A and 23B are arranged at the N pole side of the drive magnets 19, and the focusing drive coils 22A and 22B are arranged at the S pole side of the drive magnets 19 (see FIG. 1). In this way, both the magnetic field of the N pole side and the magnetic field of the S pole side of the drive magnets 19 may be used so that drive sensitivity for the objective lens 17 may be improved.

Figure 5:
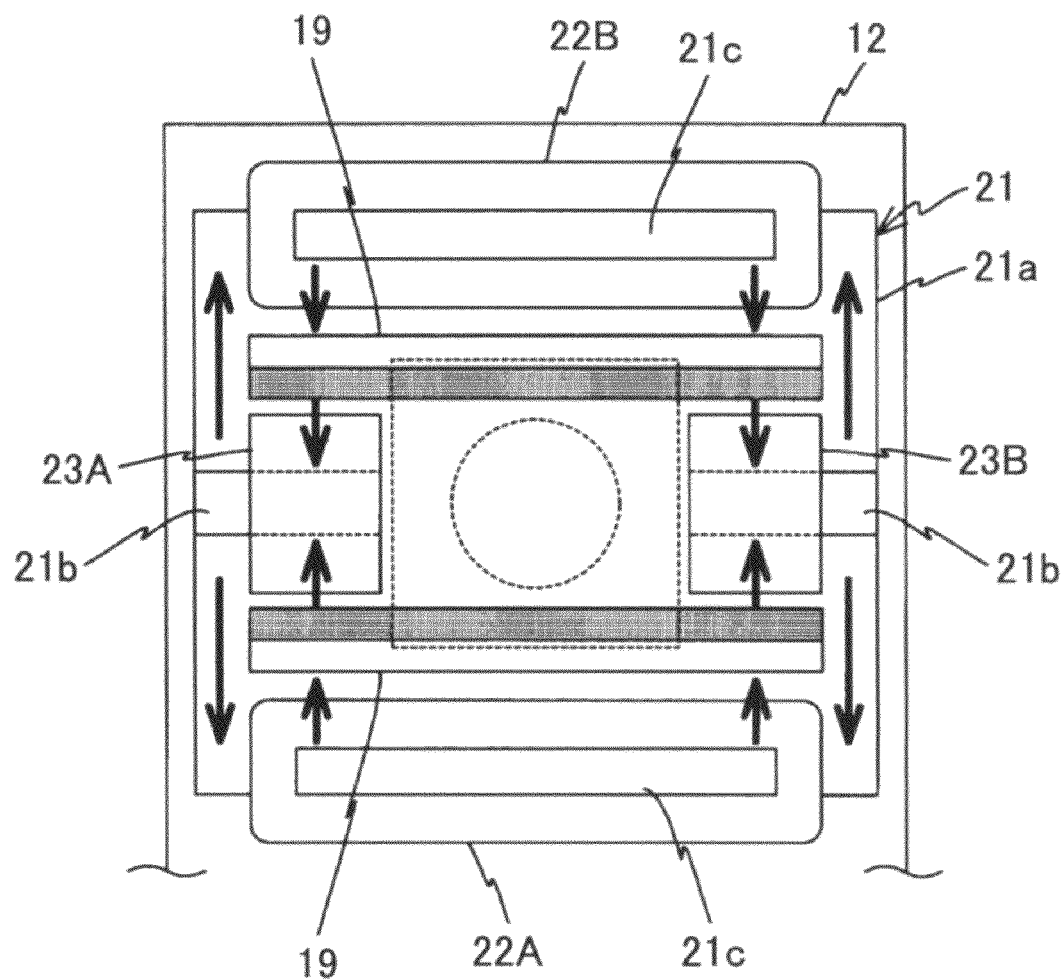
FIG. 5 is a diagram showing a magnetic circuit formed in the objective lens drive apparatus according to the first embodiment.

Also, in the present embodiment, the focusing drive coils 22A, 22B, and the tracking drive coils 23A, 23B are arranged around the first and second yoke portions 21b and 21c of the yoke member 21 that is made of magnetic material, and the lines of magnetic force from the N poles of the drive magnets 19 are guided through a magnetic circuit including the yoke member 21 to be directed toward the S poles of the drive magnets 19 (see FIG. 5). In this way, the lines of magnetic force from the N poles of the drive magnets 19 opposing each other may pass through the focusing drive coils 22A, 22B, and the tracking drive coils 23A, 23B in an efficient manner without reacting to each other so that the magnetic fields generated by the drive magnets 19 may be efficiently used and drive sensitivity for the objective lens 17 may be improved as a result.

Second Embodiment

A second embodiment of the present invention is described below with reference to FIGS. 6-8. It is noted that in these drawings, elements that are substantially identical to those shown in FIGS. 1-5 of the first embodiment are given the same reference numerals and their descriptions are omitted or simplified.

Figure 6:
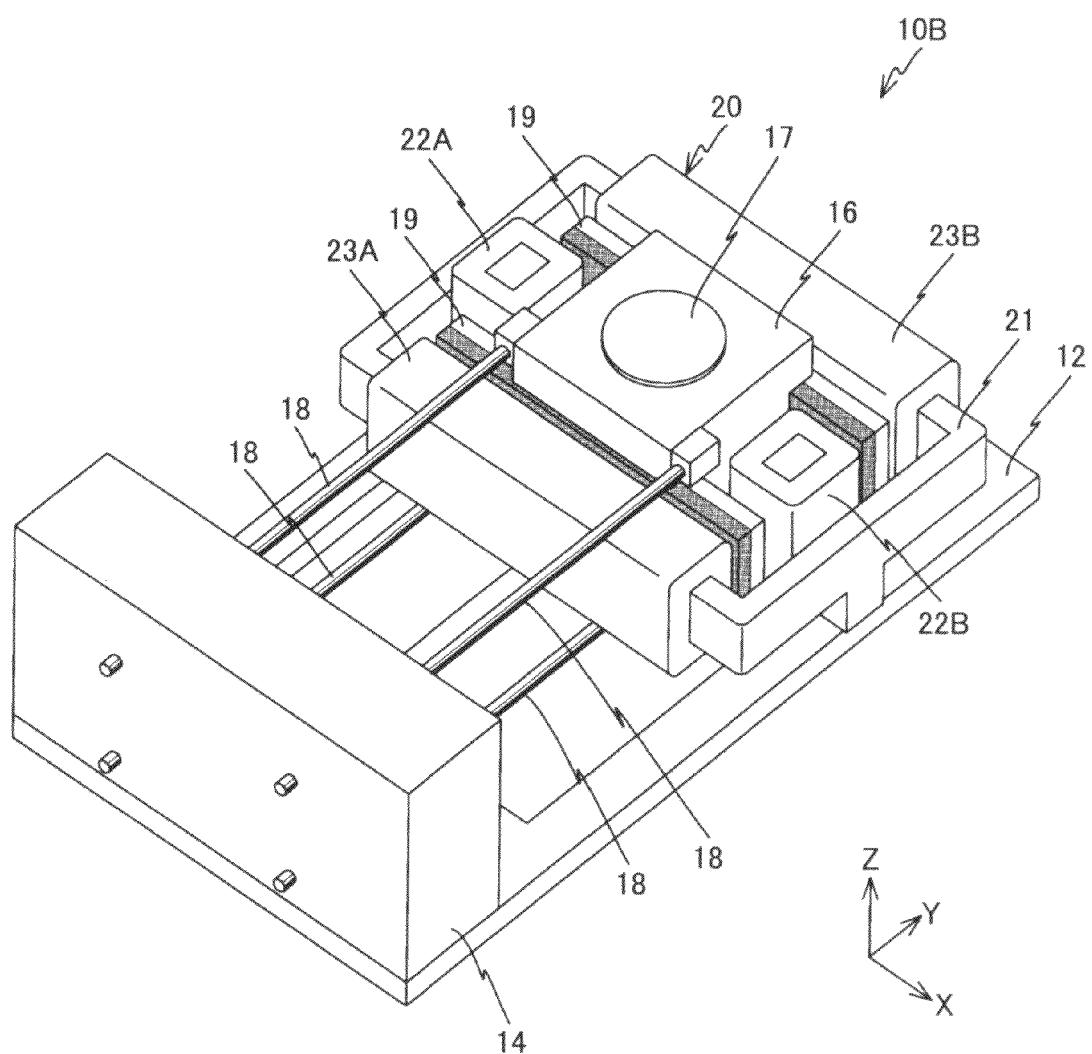
FIG. 6 is a perspective view of an objective lens drive apparatus according to a second embodiment of the present invention.

FIG. 6 is a perspective view of an objective lens drive apparatus 10B according to the second embodiment of the present invention. The illustrated objective lens drive apparatus 10B of the second embodiment may be distinguished from the objective lens drive apparatus 10A of the first embodiment in that the yoke member 21 of the coil unit 20 is arranged into a different shape and the drive coils 22A, 22B, 23A, and 23B are arranged in different positions.

Figure 7:
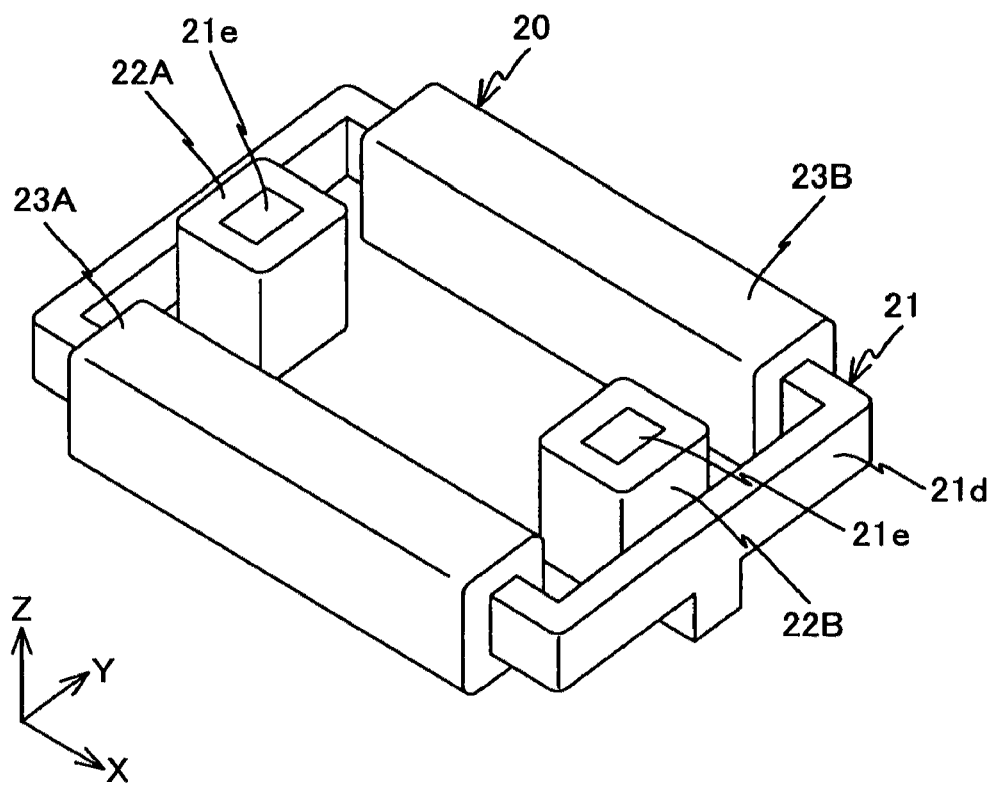
FIG. 7 is a perspective view of a coil unit of the objective lens drive apparatus according to the second embodiment.

FIG. 7 is a perspective view of the coil unit 20 of the objective lens drive apparatus 10B according to the second embodiment. As is shown in FIG. 7, the yoke member 21 of the coil unit 20 according to the present embodiment includes a first yoke portion 21d that is arranged into a rectangular frame and L-shaped second yoke portions 21e that are connected to the +X side and −X side of the first yoke portion 21d. Focusing drive coils 22A and 22B having wires wound around shafts that are parallel to the Z axis are arranged on the second yoke portions 21e, and tracking coils 23A and 23B having wires wound around shafts that are parallel to the X axis are arranged on the −Y side and the +Y side of the first yoke portion 21d.

As is shown in FIG. 6, the coil unit 20 of the present embodiment is arranged in the objective lens drive apparatus 10B with the tracking drive coils 23A and 23B being arranged at the −Y side and +Y side of the objective lens holding member 16 via the drive magnets 19 and the focusing drive coils 22A and 22B being arranged within the spaces provided between the drive magnets 19 at the −X side and +X side of the objective lens holding member 16. In this way, a magnetic circuit as is shown in FIG. 8 may be formed in the objective lens drive apparatus 10B so that the lines of magnetic force from the N poles of the drive magnets 19 penetrate through the second yoke portions 21e and the first yoke portion 21d of the yoke member 21 to be directed back to the S poles of the drive magnets 19 as is illustrated by the arrows shown in FIG. 8.

In the objective lens drive apparatus 10B according to the second embodiment of the present invention, by exciting the focusing drive coils 22A and 22B, the objective lens 17 may be driven in the focusing direction (Z axis direction) by the interaction of the focusing coils 22A and 22B with the drive magnets 19, and by exciting the tracking drive coils 23A and 23B, the objective lens 17 may be driven in the tracking direction (X axis direction) by the interaction of the tracking drive coils 23A and 23B with the drive magnets 19. Also, by exciting the focusing drive coils 22A and 22B in opposite directions, the objective lens 17 may be moved around a shaft that is parallel to the Y axis.

As can be appreciated from the above descriptions, in the objective lens drive apparatus 10B according to the second embodiment of the present invention, the tracking direction end portions of the drive magnets 19 fixed to the objective lens holding member 16 are arranged to protrude from the −X side and +X side faces of the objective lens holding member 16, the focusing drive coils 22A and 22B are arranged at the N pole side of the drive magnets 19, and the tracking drive coils 23A and 23B are arranged at the S pole side of the drive magnets 19 (see FIG. 6). In this way, both the magnetic field of the N pole side and the magnetic field of the S pole side of the drive magnets 19 may be used so that drive sensitivity for the objective lens 17 may be improved.

Figure 8:
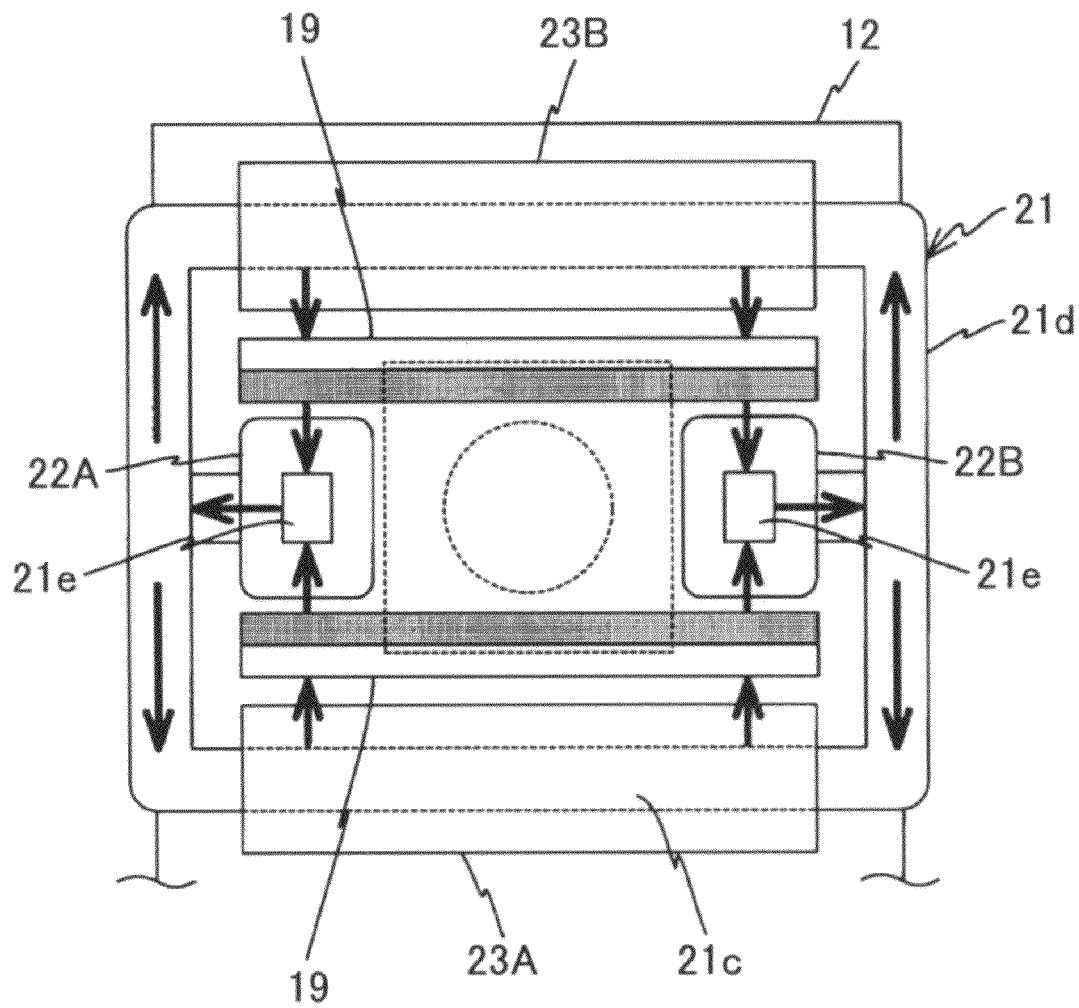
FIG. 8 is a diagram showing a magnetic circuit formed in the objective lens drive apparatus according to the second embodiment.

Also, in the present embodiment, the focusing drive coils 22A, 22B, and the tracking drive coils 23A, 23B are arranged around the first and second yoke portions 21d and 21e of the yoke member 21 that is made of magnetic material, and the lines of magnetic force from the N poles of the drive magnets 19 are guided through a magnetic circuit including the yoke member 21 to be directed toward the S poles of the drive magnets 19 (see FIG. 8). In this way, the lines of magnetic force from the N poles of the drive magnets 19 opposing each other may pass through the focusing drive coils 22A, 22B, and the tracking drive coils 23A, 23B in an efficient manner without reacting to each other so that the magnetic fields generated by the drive magnets 19 may be efficiently used and drive sensitivity for the objective lens 17 may be improved as a result.

It is noted that a conventional optical disk uses a relatively thick substrate (e.g., having a thickness of approximately 1 mm); however, an optical disk system for the so-called flexible optical disk that uses a relatively thin substrate (e.g., having a thickness of approximately 0.1 mm) is presently being developed. The flexible optical disk is provided with flexibility so that it may be prevented from being damaged even when it is rotated at a high speed at which a conventional optical disk may be broken. Thus, by using such a flexible optical disk to realize high speed rotation, data transmission speed may be increased, for example. Also, air stabilizing techniques using a stabilizer may be implemented to prevent vertical deviation even during high speed rotation of the flexible optical disk. However, it is noted that since tracking direction eccentricity characteristics of the flexible optical disk may be substantially the same as those of the conventional disk, performance of the flexible optical system may be restricted more by its tracking direction characteristics rather than its focusing direction characteristics. In this respect, the objective lens drive apparatus 10B according to the second embodiment is capable of securing a longer effective length for the tracking coils compared to the objective lens drive apparatus 10A according to the first embodiment so that it may be better adapted for improving acceleration characteristics in the tracking direction than the acceleration characteristics in the focusing direction (Z axis direction). In other words, the objective lens drive apparatus 10B according to the second embodiment is designed to meet the acceleration sensitivity characteristic requirements of a flexible optical disk system.

Third Embodiment

A third embodiment of the present invention is described below with reference to FIGS. 9-11. It is noted that in these drawings, elements that are substantially identical to those of the first embodiment and the second embodiment are given the same reference numerals and their descriptions are omitted or simplified.

Figure 9:
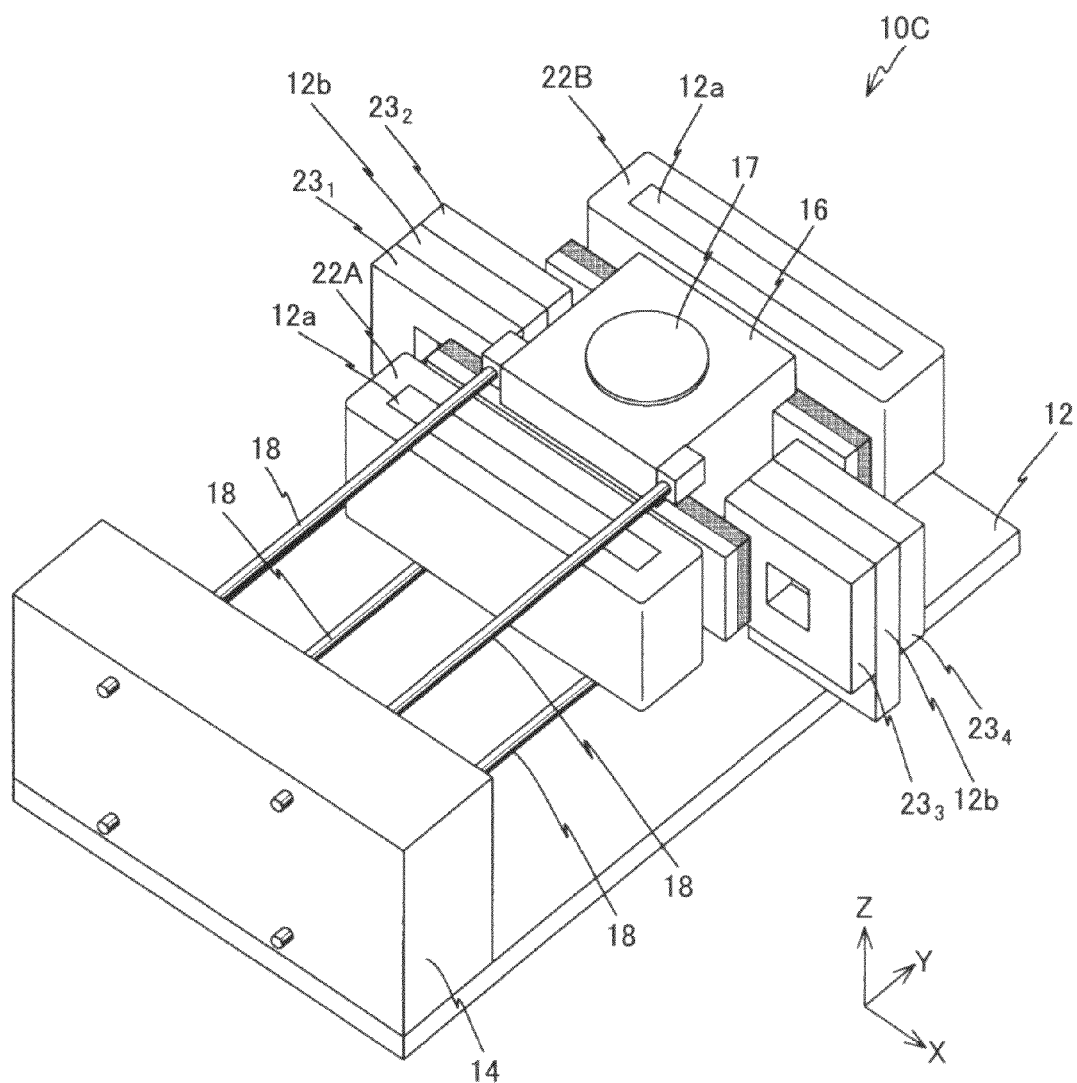
FIG. 9 is a perspective view of an objective lens drive apparatus according to a third embodiment of the present invention.

FIG. 9 is a perspective view of an objective lens drive apparatus 10C according to the third embodiment of the present invention. The illustrated objective lens drive apparatus 10C of the third embodiment may be distinguished from the objective lens drive apparatuses 10A and 10B of the first and second embodiment in that the opposing faces of the drive magnets 19 are arranged to have different magnetic polarities. Also, as a consequence of such an arrangement, the base 12 is arranged to function as a yoke member in the present embodiment.

Figure 10:
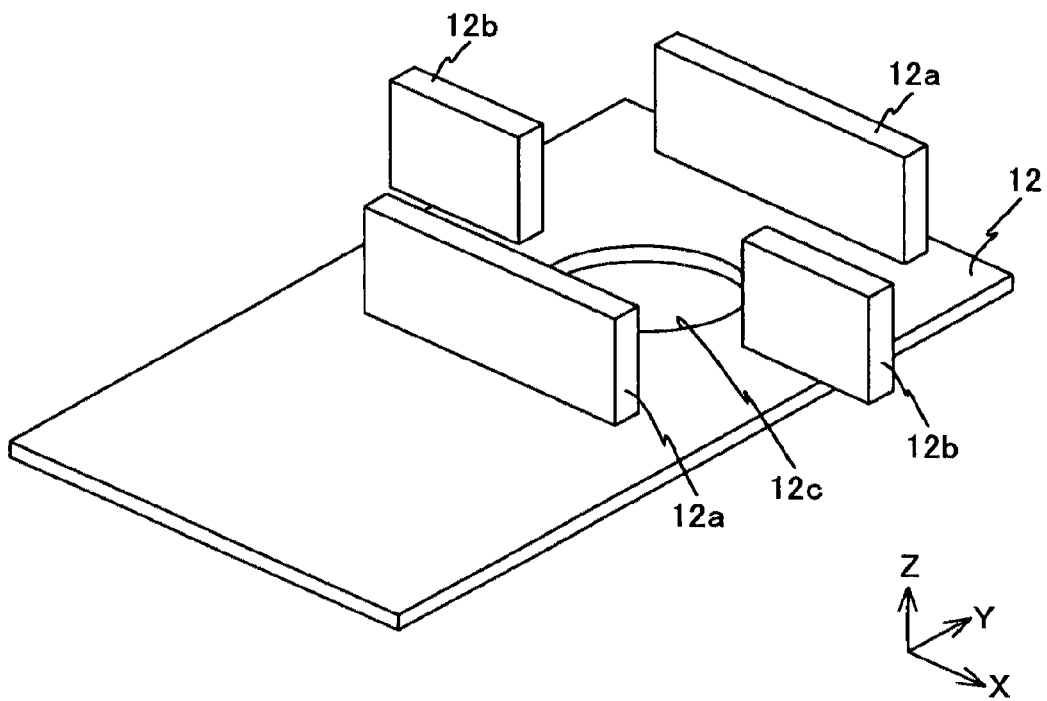
FIG. 10 is a perspective view of a base of the objective lens drive apparatus according to the third embodiment.

FIG. 10 is a perspective view of the base 12 according to the present embodiment. In FIG. 10, the base 12 is a rectangular frame-shaped member having a long side extending in the Y axis direction that is made of a magnetic material such as iron. The illustrated base 12 has a circular opening 12c formed at a position slightly toward the +Y side of its center for enabling passage of a laser beam transmitted through the objective lens 17, first yoke portions 12b arranged at the +X side and –X side of the circular opening 12c, and second yoke portions 12a arranged at the +Y side and –Y side of the circular opening 12c. As is shown in FIG. 9, four tracking drive coils $23_1$, $23_2$, $23_3$, and $23_4$ having wires wound around shafts that are parallel to the Y axis are fixed to the +Y side and –Y side faces of the first yoke portions 12b, and focusing drive coils 22A and 22B having wires wound around shafts parallel to the Z axis are fixed to the second yoke portions 12a. Thus, the focusing coils 22A and 22B are arranged at the –Y side and +Y side of the objective lens holding member 16 via the drive magnets 19, and +X side portions of the tracking drive coils $23_1$ and $23_2$ where currents flow in the focusing direction (Z axis direction) and –X side portions of the tracking drive coils $23_3$ and $23_4$ where currents flow in the focusing direction (Z axis direction) are arranged within the spaces provided between the drive magnets 19.

Figure 11:
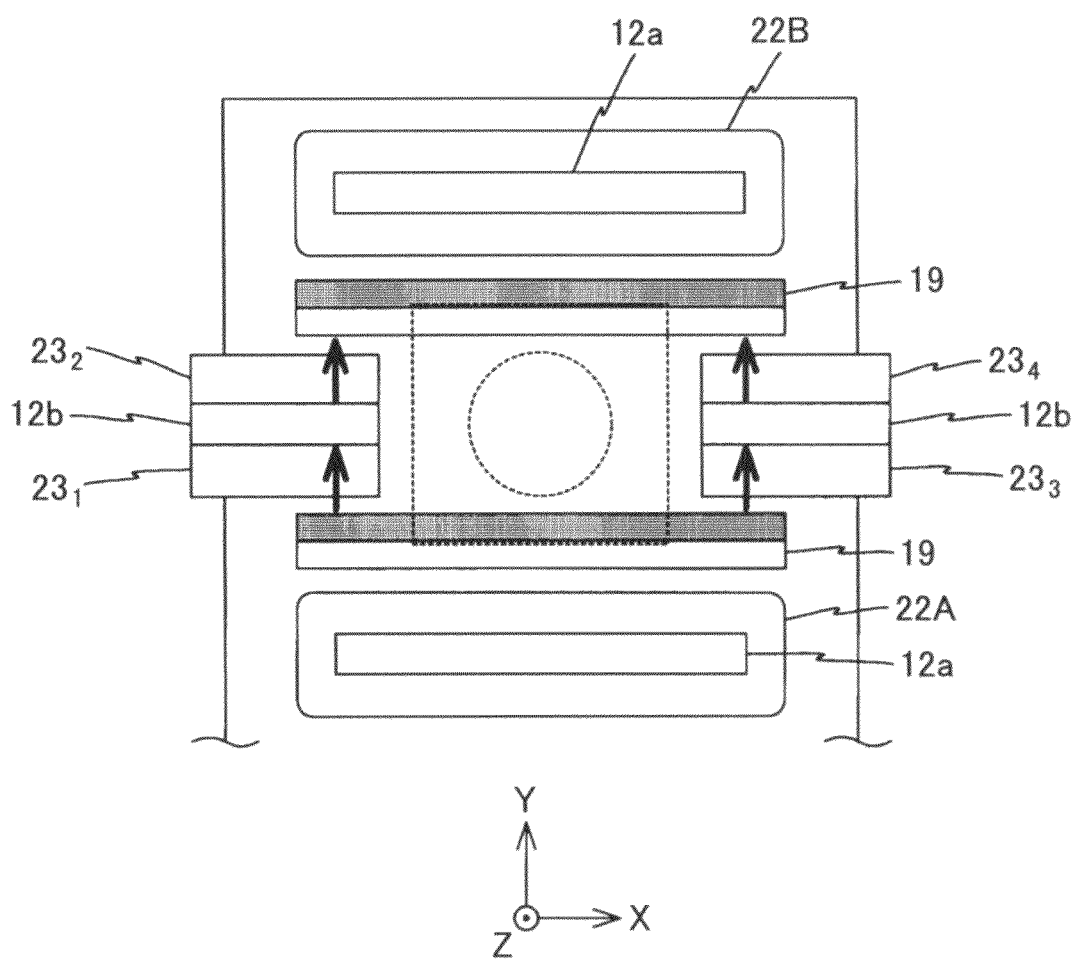
FIG. 11 is a diagram showing a magnetic circuit formed in the objective lens drive apparatus according to the third embodiment.

As is shown in FIG. 11 a magnetic circuit is formed in the objective lens drive apparatus 10C according to the present embodiment so that the lines of magnetic force from the N pole of the drive magnet 19 arranged at the –Y side of the objective lens holding member 16 penetrate through the portions of the tracking drive coils $23_1$-$23_4$ where currents flow in the focusing direction to enter the S pole of the opposing drive magnet 19 arranged at the +Y side of the objective lens holding member 16. Then, the lines of magnetic force exit the drive magnet 19 arranged at the +Y side from its N pole to successively penetrate through the focusing drive coil 22B, the second yoke portion 12a on which the focusing drive coil 22B is arranged, the base 12, the focusing drive coil 22A, and the second yoke portion 12a on which the focusing drive coil 22A is arranged in this order after which the lines of magnetic force reenter the drive magnet 19 arranged at the –Y side from its S pole. According to the present embodiment, magnetic fields from the drive magnets 19 may be prevented from cancelling each other without having to create a magnetic circuit using a dedicated yoke member such as the yoke member 21 of the objective lens drive apparatuses 10A and 10B according to the first and second embodiments. Therefore, more lines of magnetic force may be arranged to penetrate through the portions of the tracking drive coils $23_1$-$23_4$ where currents flow in the focusing direction so that drive sensitivity for the objective lens 17 may be improved.

Figure 12:
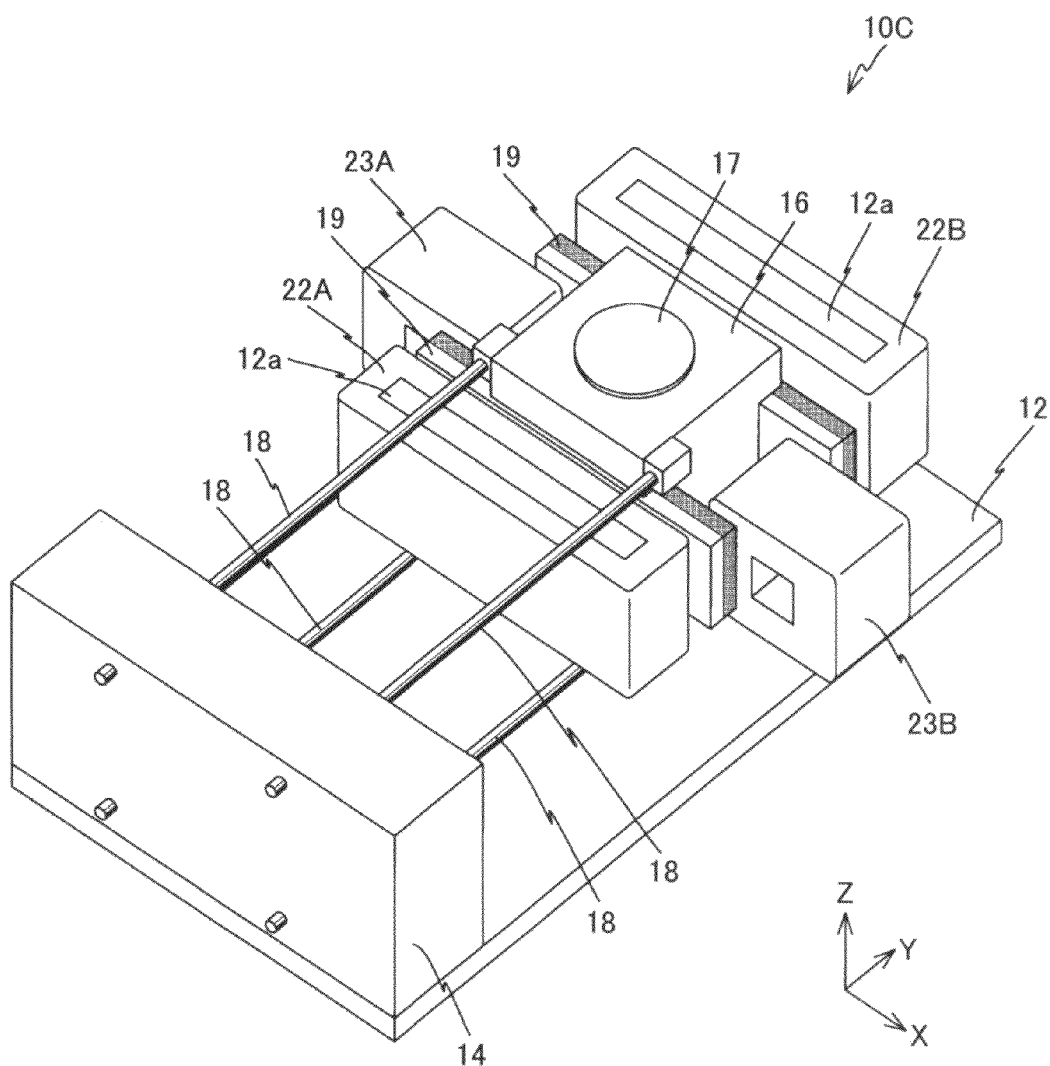
FIG. 12 is a diagram showing a first modified configuration of the objective lens drive apparatus according to the third embodiment.

It is noted that in the objective lens drive apparatus 10C according to the third embodiment of the present invention, four tracking drive coils $23_1$-$23_4$ are used. With such a configuration, the distance between the tracking drive coils $23_1$-$23_4$ and the drive magnets 19 may be adjusted by adjusting the thickness of the first yoke portions 12b of the base 12. Accordingly, even when general purpose coils are used as the tracking drive coils $23_1$-$23_4$, for example, adequate gaps may be secured between the tracking drive coils $23_1$-$23_4$ and the drive magnets 19. Also, the present embodiment may be modified to have the tracking drive coils $23_1$ and $23_2$ integrated into a single tracking coil 23A and the tracking drive coils $23_3$ and $23_4$ integrated into a single tracking coil 23B as is shown in FIG. 12.

Figure 13:
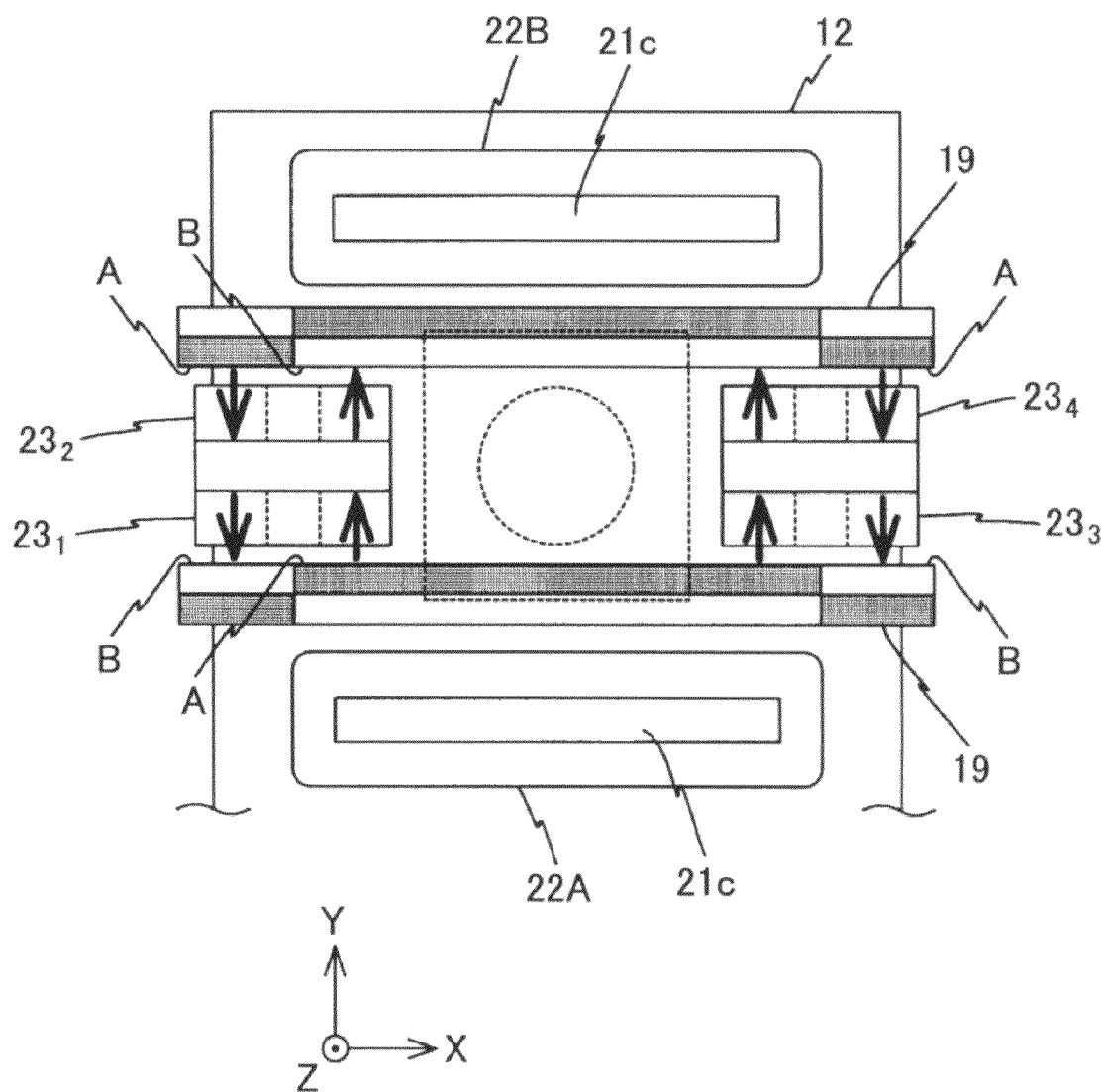
FIG. 13 is a diagram showing a second modified configuration of the objective lens drive apparatus according to the third embodiment.

Further, the present embodiment may be modified to have a configuration as is shown in FIG. 13 where the protruding portions of the drive magnets 19 are each divided into regions A and B having differing magnetic pole orientations, region A facing one X direction side portion of a tracking drive coil 23 and region B facing the other X direction portion of the tracking drive coil 23, and regions of the drive magnets 19 opposing each other are arranged to have differing magnetic polarities. In this way, the lines of magnetic force from the drive magnets may be arranged in the directions illustrated by the arrows shown in FIG. 13. Specifically, electric fields in opposite directions may be applied to the +X side and the –X side of the drive coils 23 so that the electromagnetic force generated by interaction of the drive coils 23 with the drive magnets 19 may be increased by approximately two times, for example. Also, by arranging the lines of magnetic force from region A to reenter the drive magnet 19 from region B, the lines of magnetic force may penetrate through the drive coils 23 in an efficient manner so that the drive sensitivity for the objective lens 17 may be improved as a result.

Figure 14:
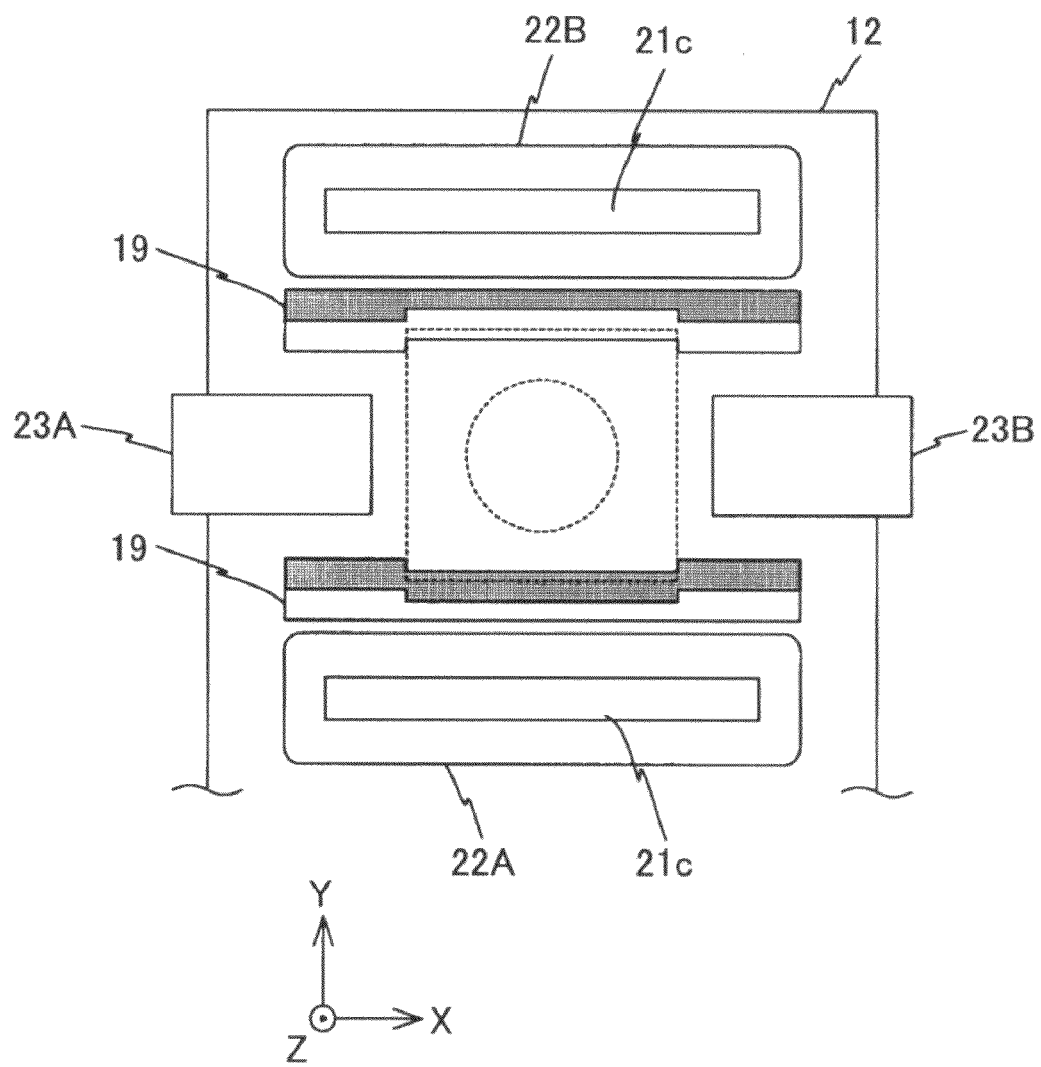
FIG. 14 is a diagram showing a first modified configuration of a pair of drive magnets.

It is noted that although the drive magnets 19 are arranged into rectangular plates in the above-described embodiments of the present invention, other embodiments of the present invention may use drive magnets 19 having different configurations as is shown in FIG. 14, for example. In FIG. 14, the portions of the drive magnets 19 protruding from the objective lens holding member 16 are arranged to be thicker in the tangential direction (Y axis direction). By arranging the protruding portions at the sides to be thicker than the portions of the drive magnets 19 at the center, weight increase of the drive magnets 19 may be controlled to a minimum while increasing the magnetic field intensity of regions surrounding the drive coils, for example.

Figure 15:
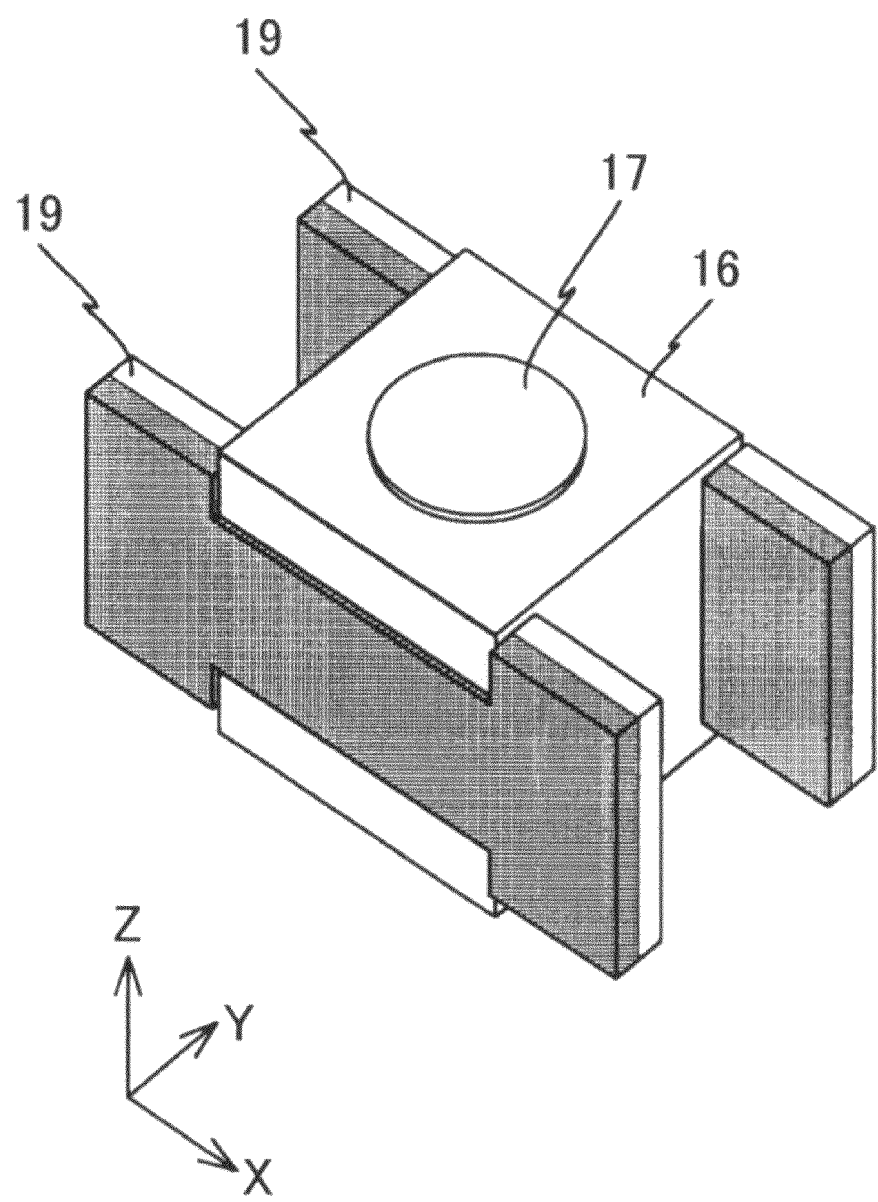
FIG. 15 is a diagram showing a second modified configuration of the pair of drive magnets.

FIG. 15 illustrates another embodiment in which the portions of the drive magnets 19 protruding from the objective lens holding member 16 are arranged to be wider than the center portions. Specifically, dimensions of the protruding portions are increased in the focusing direction (Z axis direction). By arranging the protruding portions of the drive magnets 19 at the sides to be wider than the center portions, weight increase of the drive magnets 19 may be controlled to a minimum while increasing the effective areas of the opposing faces of the drive coils.

Also, it is noted that print coils formed on a printed circuit board may be used as the drive coils of the above-described embodiments, for example. In this way, unevenness of the drive coil surfaces may be reduced so that gaps formed between the drive magnets and the drive coils may be narrowed and the lines of magnetic force penetrating through the drive coils may be increased to thereby improve the drive sensitivity for the objective lens.

<Optical Disk Apparatus>

In the following, an optical disk apparatus including an objective lens drive apparatus according to an embodiment of the present invention is described.

Figure 16A:
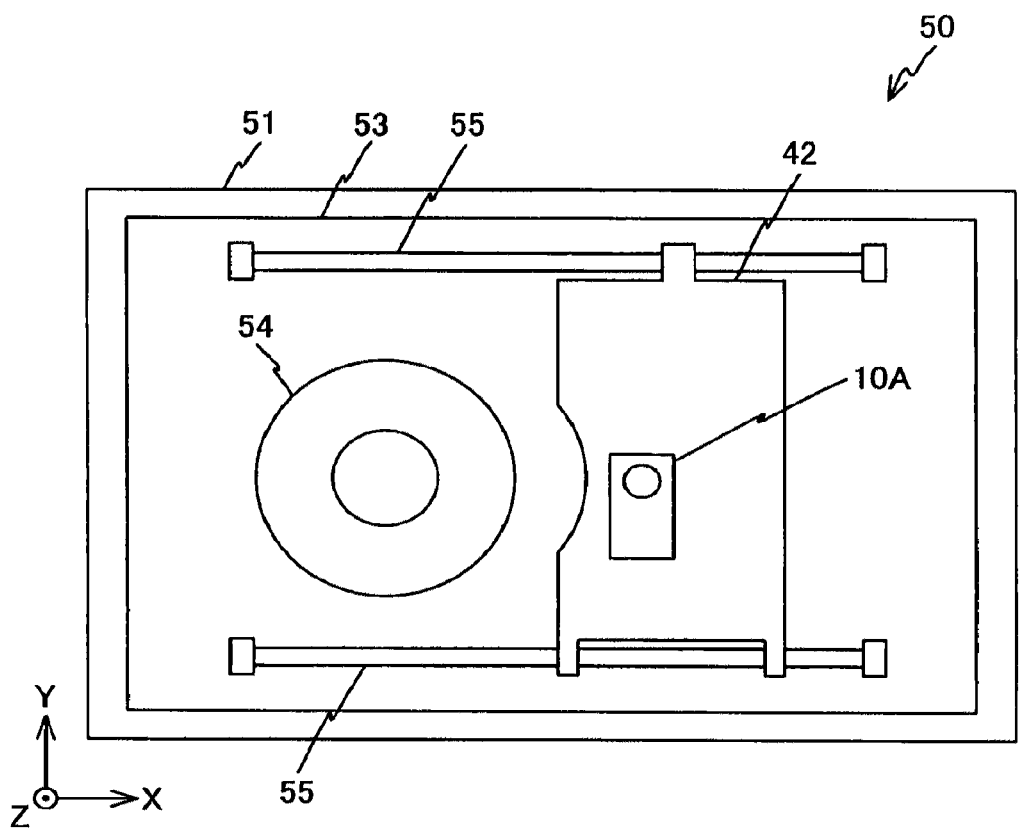
FIG. 16A is a plan view of an optical disk apparatus according to an embodiment of the present invention.
Figure 16B:
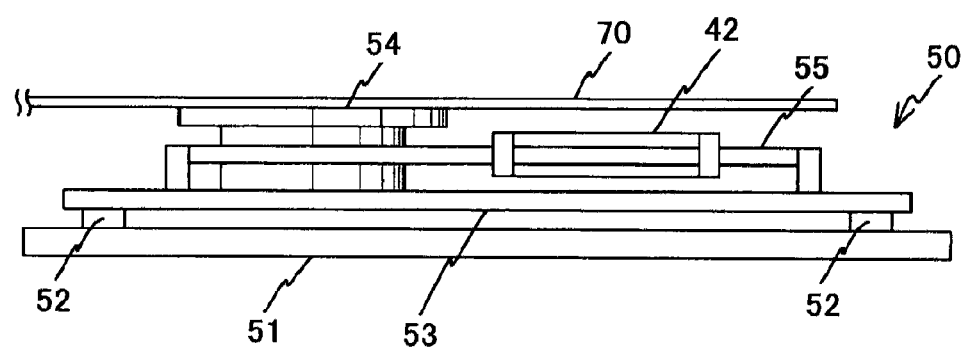
FIG. 16B is a side view of the optical disk apparatus shown in FIG. 16A.

FIG. 16A is a plan view and FIG. 16B is a side view of an optical disk apparatus 50 that includes the above-described objective lens drive apparatus 10A. As is shown in these drawings, the optical disk apparatus 50 includes a housing 51, a rubber vibration isolator 52 that is arranged on the upper face of the housing 51, an optical pickup module base 53 that is supported by the rubber vibration isolator 52 to be substantially horizontal, a spindle motor 54 that supports an optical disk 70 and enables the optical disk 70 to rotate around a shaft that is parallel to the Z axis, a pair of seek rails 55 extending in the X axis direction and arranged at the +Y side and −Y side of the upper face of the pickup module base 53, and an optical pickup 42 that is guided by the pair of seek rails 55 and moves the objective lens drive apparatus 10A in the X axis direction.

Figure 17:
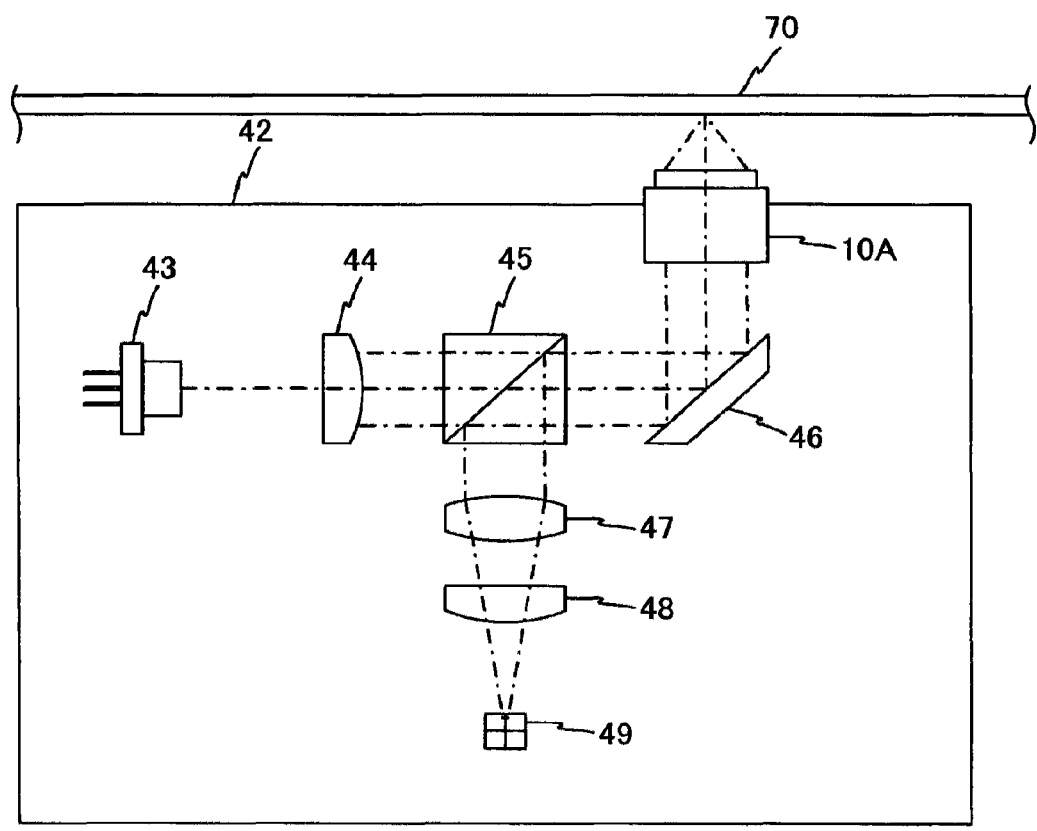
FIG. 17 is a diagram showing an optical pickup according to an embodiment of the present invention.

FIG. 17 is a diagram showing a configuration of the optical pickup 42 of the optical disk apparatus 50. As is shown in this drawing, the optical pickup 42 includes a light source 43, a collimator lens 44, a beam splitter 45, a mirror 46, a condenser lens 47, a cylindrical lens 48, an optical receiver 49, and the objective lens drive apparatus 10A. In the illustrated optical pickup 42, a laser beam emitted from the light source 43 is made substantially parallel by the collimator lens 44 after which the collimated laser beam passes through the beam splitter 45 to be incident on and reflected by the mirror 46. The reflected laser beam is directed upward to be incident on the objective lens 17 of the objective lens drive apparatus 10A so that a laser spot may be formed on the optical disk 70. Also, a laser beam reflected by the optical disk 70 passes through the objective lens 17 and is refracted in a downward direction by the beam splitter 45 to be incident to the optical receiver 49 via the condenser lens 47 and the cylindrical lens 48.

In the optical disk apparatus 50, the optical pickup 42 is arranged to carry out seek operations with respect to the optical disk 70 that is driven by the spindle motor 54 to rotate at a predetermined rotational speed so that an opto-electric conversion signal may be output from the optical receiver 49, and the focusing drive coils 22A, 22B and the tracking drive coils 23A, 23B of the objective lens drive apparatus 10A are driven based on this opt-electric conversion signal. In this way, the objective lens 17 may be controlled to follow the positional change of the track formed on the optical disk 70 to read information recorded on the optical disk 70 and record information on the optical disk 70.

As can be appreciated from the above descriptions, by including the objective lens drive apparatus 10A, the optical pickup 42 may be able to accurately drive the objective lens 17 to thereby accurately focus a laser beam on a track of an optical disk. Also, since the objective lens drive apparatus 10A has good acceleration sensitivity characteristics and high degree resonance characteristics, read/write operations may be accurately performed even when the optical disk is rotated at high speed. It is noted that although the above-described optical pickup 42 according to an embodiment of the present invention uses the objective lens drive apparatus 10A, in other embodiments, the objective lens drive apparatus 10B or 10C may be used, for example.

Also, by including the optical pickup 42, the optical disk apparatus may be able to accurately focus a laser beam on a track of the optical disk 70 so that it may accurately read/write information from/on the optical disk 70.

As can be appreciated from the above descriptions, an objective lens drive apparatus according to an embodiment of the present invention may be used to accurately drive an objective lens upon reading/writing information from/on an optical disk. An optical pickup according to an embodiment of the present invention may be used to accurately focus a laser beam on a track of an optical disk. An optical disk apparatus according to an embodiment of the present invention may be used to accurately read/write information from/on an optical disk.

Although the present invention is shown and described with respect to certain preferred embodiments, it is obvious that equivalents and modifications may occur to others skilled in the art upon reading and understanding the specification. The present invention includes all such equivalents and modifications, and is limited only by the scope of the claims.

The present application is based on and claims the benefit of the earlier filing date of Japanese Patent Application No. 2006-343713 filed on Dec. 21, 2006, the entire contents of which are hereby incorporated by reference.

What is claimed is:

1. An objective lens drive apparatus configured to drive an objective lens that focuses a laser beam on an optical disk, the apparatus comprising:

a holding member that holds the objective lens;

at least one pair of drive magnets arranged to face each other at opposite sides of the holding member with respect to a tangential direction that is parallel to a tangential line of the optical disk, the drive magnets being permanent magnets having protruding end portions that protrude from each side of the holding member with respect to a tracking direction that is parallel to a radial direction of the optical disk; and a plurality of drive coils configured to drive the holding member through interaction with the drive magnets, at least one of the drive coils being arranged on each side of the drive magnets with respect to the tangential direction; and wherein the drive coils include at least one pair of first drive coils arranged in between the drive magnets and at least one pair of second drive coils arranged at opposite sides of the pair of drive magnets with respect to the tangential direction, the second drive coils having center axes extending in a direction perpendicular to a center axis direction of the first drive coils.

2. The objective lens drive apparatus as claimed in claim 1, wherein the drive magnets are arranged to have opposing faces that have a same magnetic polarity, and the center axis direction of the first drive coils is arranged to be parallel to the tracking direction or a focusing direction that is perpendicular to the tangential direction and the tracking direction.

3. The objective lens drive apparatus as claimed in claim 2, wherein cores of the first drive coils and cores of the second drive coils are magnetically connected.

4. The objective lens drive apparatus as claimed in claim 1, wherein the drive magnets are arranged to have opposing faces that have differing magnetic polarities, and the center axis direction of the first drive coils is arranged to be parallel to the tangential direction.

5. The objective lens drive apparatus as claimed in claim 4, wherein the first drive coils each include a first portion and a second portion arranged in the tangential direction which first portion and second portion are divided by a magnetic member.

6. The objective lens drive apparatus as claimed in claim 4, wherein the drive magnets each include at least two regions each facing one of two portions of a corresponding first drive coil of the first drive coils which portions have currents flowing in the focusing direction, said at least two regions of the drive magnets being arranged to have differing magnetic polarities.

7. The objective lens drive apparatus as claimed in claim 1, wherein the protruding end portions of the drive magnets are arranged to have greater dimensions in the tangential direction compared to other portions of the drive magnets.

8. The objective lens drive apparatus as claimed in claim 1, wherein the protruding end portions of the drive magnets are arranged to have greater dimensions in the focusing direction compared to other portions of the drive magnets.

9. The objective lens drive apparatus as claimed in claim 1, wherein the first drive coils or the second drive coils that are configured to drive the drive magnets in the focusing direction are configured to drive the objective lens in a tilting direction by being excited in opposite directions or at different power levels.

10. An optical pickup configured to irradiate a laser beam on an optical disk and receive reflected light from the optical disk, the optical pickup comprising:
    a light source that irradiates the laser beam;
    an objective lens drive apparatus that focuses the laser beam irradiated from the light source on a recording surface of the optical disk; and
    a light receiving system that receives the reflected light that is reflected by the recording surface of the optical disk;
    wherein the objective lens drive apparatus includes
    a holding member that holds the objective lens;
    at least one pair of drive magnets arranged to face each other at opposite sides of the holding member with respect to a tangential direction that is parallel to a tangential line of the optical disk, the drive magnets being permanent magnets having protruding end portions that protrude from each side of the holding member with respect to a tracking direction that is parallel to a radial direction of the optical disk; and
    a plurality of drive coils configured to drive the holding member through interaction with the drive magnets, at least one of the drive coils being arranged on each side of the drive magnets with respect to the tangential direction; and
    wherein the drive coils include at least one pair of first drive coils arranged in between the drive magnets and at least one pair of second drive coils arranged at opposite sides of the pair of drive magnets with respect to the tangential direction, the second drive coils having center axes extending in a direction perpendicular to a center axis direction of the first drive coils.

11. An optical disk apparatus that performs at least one of information read operations or information write operations on an optical disk, the optical disk apparatus comprising:
    a rotational drive system that rotates the optical disk;
    an optical pickup that irradiates a laser beam on a recording surface of the optical disk that is rotated by the rotational drive system; and
    a seek system that moves the optical pickup in a tracking direction of the optical disk;
    wherein the optical pickup includes a light source that irradiates the laser beam, an objective lens drive apparatus that focuses the laser beam irradiated from the light source on a recording surface of the optical disk, and a light receiving system that receives the reflected light reflected by the recording surface of the optical disk, said objective lens drive apparatus including
    a holding member that holds the objective lens;
    at least one pair of drive magnets arranged to face each other at opposite sides of the holding member with respect to a tangential direction that is parallel to a tangential line of the optical disk, the drive magnets being permanent magnets having protruding end portions that protrude from each side of the holding member with respect to the tracking direction that is parallel to a radial direction of the optical disk; and
    a plurality of drive coils configured to drive the holding member through interaction with the drive magnets, at least one of the drive coils being arranged on each side of the drive magnets with respect to the tangential direction; and
    wherein the drive coils include at least one pair of first drive coils arranged in between the drive magnets and at least one pair of second drive coils arranged at opposite sides of the pair of drive magnets with respect to the tangential direction, the second drive coils having center axes extending in a direction perpendicular to a center axis direction of the first drive coils.

* * * * *